W. G. COX.
DUPLEX BAR BUMPER FOR AUTOMOBILES.
APPLICATION FILED JAN. 23, 1922.

1,412,554. Patented Apr. 11, 1922.

Inventor
W. G. COX.
By Fisher, Meeker & Ruwork
Attorneys

UNITED STATES PATENT OFFICE.

WILLIAM G. COX, OF CLEVELAND, OHIO.

DUPLEX-BAR BUMPER FOR AUTOMOBILES.

1,412,554.  Specification of Letters Patent.  Patented Apr. 11, 1922.

Application filed January 23, 1922. Serial No. 531,033.

*To all whom it may concern:*

Be it known that I, WILLIAM G. COX, a citizen of the United States, residing at Cleveland, in the county of Cuyahoga and State of Ohio, have invented certain new and useful Improvements in a Duplex-Bar Bumper for Automobiles, of which the following is a specification.

In the bumper now under consideration I provide two straight impact bars of spring metal spaced apart vertically and uniformly the full length of the bumper and looped inwardly and offset in a vertical plane at each end to permit the end portions of the two bars to be united together as a single supporting bar adapted to be engaged and upheld in suitable brackets affixed to the frame ends of an automobile, and the looped offset portions of each bar incline reversely toward each other and the inturned end portions are of different length. The two bars are also counterparts so that one bar may be inverted in respect to the other and united together to provide a complete bumper in which two independently flexible impact portions of extended length are placed parallelly one above the other to act either jointly or separately in meeting a shock or blow. Where relatively springy bars are used and the tendency of the long stretches is to vibrate between the looped ends in the travel of the vehicle over the road, I interpose an anti-rattling and re-enforcing spring loop between the two front bars and the rear supporting bar mid-length of the bumper and use a single bolt to secure this device and the meeting ends of the bars together.

Figure 1:
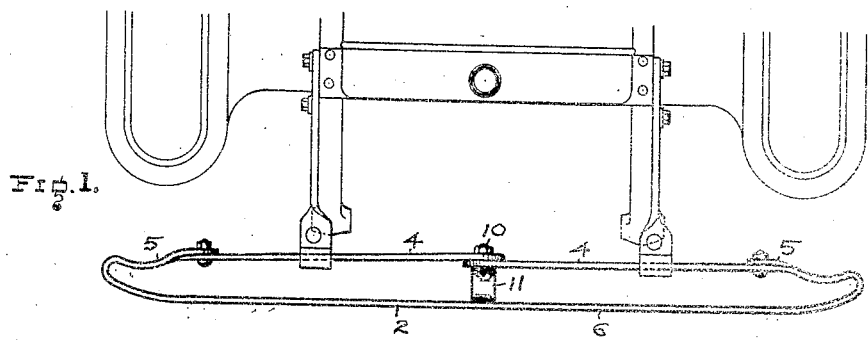
Figure 2:
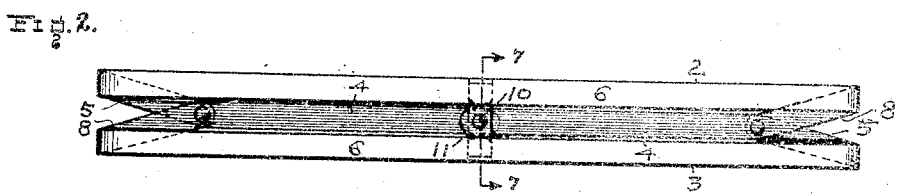
Figure 3:
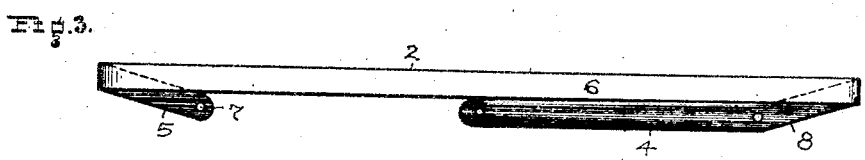
Figure 4:
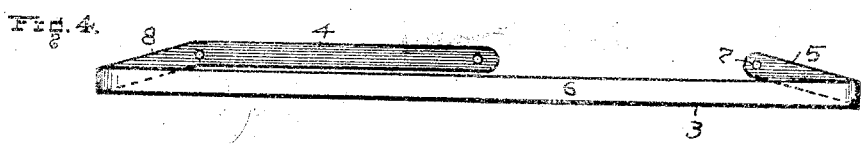
Figure 5:
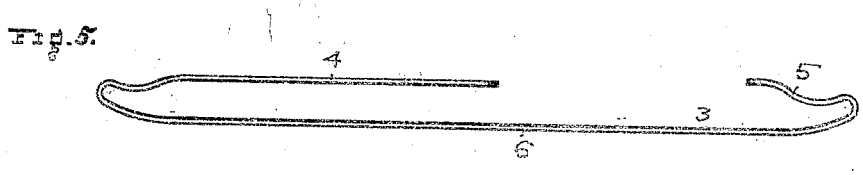
Figure 7:
Figure 6:
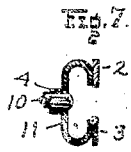
Figure 8:
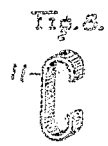
Figure 9:
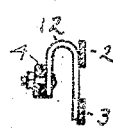

In the drawing forming part of this application, Fig. 1 is a plan view of my improved bumper mounted upon the frame ends of an automobile, and Fig. 2 is a front elevation of the bumper alone. Fig. 3 is a front view of one of the counterpart bars, while Fig. 4 shows the same bar inverted. Fig. 5 is a plan or edge view of the bar shown in Fig. 4. Fig. 6 is an end view of the bumper, and Fig. 7 a vertical cross-section on line 7—7 of Fig. 2. Fig. 8 is a perspective view of the anti-rattling and reenforcing spring. Fig. 9 is a cross-section of the bumper showing a modified form of anti-rattling and reenforcing spring.

As hereinbefore stated, the bumper comprises two counterpart bars 2 and 3 made of flat spring metal, and therefore, a description of one bar applies equally to the other. Thus, each bar is a straight bar looped back upon itself to provide a long arm 4 and a short arm 5 extending toward each other at the rear side of the main straight impact portion 6. Short arm 5 is bent vertically at an inclination in respect to the straight impact portion 6 and provided with a bolt hole 7 near its extremity, whereas longer arm 4 extends for the greater part of its length parallel with impact portion although also bent vertically at an inclination at 8 where joined with the loop end of the bar. In this way the straight portion of long arm 4 is offset vertically in respect to the main impact portion, and the inclined portions at each end are inclined reversely to each other. This permits a pair of counterpart bars to be reversely related and assembled with the ends of the long arms 4 overlapping each other and the ends of the short arms 5 also overlapping the base ends of the long arms, and bolts or rivets may then be introduced through the registering bolt openings in the overlapping parts to unite the bars rigidly together. A single bolt 10 is used to fasten the ends of the long arms to each other and to a spring clip 11 of flat strap metal having flexible ends adapted to bear against the rear sides of the impact portions 6 of the two assembled bars, see Fig. 7. Each bar is thus braced and cushioned at its middle and prevented from vibrating and rattling by the bent ends of clip 11, and substantially the same result may be effected by a U-shaped spring 12 secured in the same backing relation, see Fig. 9.

What I claim, is—

1. An automobile bumper, comprising two spring bars having straight impact portion extending parallelly the full length of the bumper and adapted to be flexed independently and having looped ends and reversely-inclined overlapping arm portions united together and adapted to support said straight impact portions in spaced parallelism.

2. A duplex bar bumper for automobiles, comprising two straight impact bars of spring metal spaced apart vertically the full length of the bumper and looped and offset toward each other in a vertical plane at each end and having straight arms united together to form a single rear supporting bar for both impact bars.

3. A duplex bar bumper for automobiles, comprising two parallel front impact bars and a single rear supporting bar spaced apart from said front bars, and a spring clip interposed between said front and rear bars adapted to prevent vibration and rattling.

4. A duplex bar bumper for automobiles, comprising two counterpart bars, having straight impact portions extending parallelly in vertically spaced relation the full length of the bumper and looped rearwardly at each end and having offset portions inclined reversely toward each other and arms affixed to each other, and an anti-rattling and reenforcing spring loop interposed between the impact portions and said arms.

In testimony whereof I affix my signature.

WILLIAM G. COX.